(12) United States Patent
Gudino Carrizales

(10) Patent No.: US 12,244,236 B2
(45) Date of Patent: Mar. 4, 2025

(54) ACTIVE CLAMP BUCK AND ACTIVE CLAMP FLYBACK POWER CONVERTER

(71) Applicant: Robert Bosch GmbH, Stuttgart (DE)

(72) Inventor: Emiliano Gudino Carrizales, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 17/914,512

(22) PCT Filed: Jan. 21, 2021

(86) PCT No.: PCT/EP2021/051313
§ 371 (c)(1),
(2) Date: Sep. 26, 2022

(87) PCT Pub. No.: WO2021/190800
PCT Pub. Date: Sep. 30, 2021

(65) Prior Publication Data
US 2023/0134977 A1 May 4, 2023

(30) Foreign Application Priority Data
Mar. 27, 2020 (DE) .................. 10 2020 203 991.7

(51) Int. Cl.
*H02M 3/335* (2006.01)
*H02M 1/00* (2006.01)

(52) U.S. Cl.
CPC ..... *H02M 3/33576* (2013.01); *H02M 1/0095* (2021.05); *B60L 2210/10* (2013.01)

(58) Field of Classification Search
CPC .............................................. H02M 3/335–42
See application file for complete search history.

(56) References Cited

U.S. PATENT DOCUMENTS

| | | | |
|---|---|---|---|
| 11,018,593 B1* | 5/2021 | Yau | H02M 1/083 |
| 2001/0033498 A1 | 10/2001 | Lee | |
| 2023/0098360 A1* | 3/2023 | Park | B60L 53/20 |
| | | | 363/89 |

FOREIGN PATENT DOCUMENTS

DE       102016220679 A1    4/2018

OTHER PUBLICATIONS

S. - Y. Tseng, J. . -S. Kuo, S. . -W. Wang and C. . -T. Hsieh, "Buck-Boost Combined with Active Clamp Flyback Converter for PV Power System," 2007 IEEE Power Electronics Specialists Conference, Orlando, FL, USA, 2007, pp. 138-144, (Year: 2007).*
Wu, Sen-Tung, and Yu-Ting Cheng. 2021. "Design and Implementation of a Single-Stage PFC Active-Clamp Flyback Converter with Dual Transformers" Electronics 10, No. 21: 2588. (Year: 2021).*
Translation of International Search Report for Application No. PCT/EP2021/051313 dated Apr. 26, 2021 (3 pages).

(Continued)

*Primary Examiner* — Peter M Novak
(74) *Attorney, Agent, or Firm* — Michael Best & Friedrich LLP

(57) ABSTRACT

The invention relates to a DC voltage converter for transferring power from a high voltage network to a low voltage network. As a result, a circuit configuration which can be operated alternatively as an active-clamp flyback converter or an active-clamp buck converter is used.

8 Claims, 2 Drawing Sheets

(56) References Cited

OTHER PUBLICATIONS

Huber et al., "Analysis, Design, and Performance Evaluation of Asymmetrical Half-Bridge Flyback Converter for Universal-Line-Voltage-Range Applications", IEEE Applied Power Electronics, 2017, pp. 2481-2487.
Alou et al., "A low power topology derived from Flyback with Active Clamp based on a very simple transformer", IEEE Applied Power Electronics, 2006, pp. 627-632.
Baojing et al., "Novel high step-up gain converters without forward and reverse recovery current issue of rectifying diodes", IEEE Industrial Electronics, 2012, pp. 1807-1812.
Huang et al., "Analysis and Design of a Single-Stage Buck-Type AC-DC Adaptor", IEEE Applied Power Electronics, 2017, pp. 16-22.

\* cited by examiner

ACTIVE CLAMP BUCK AND ACTIVE CLAMP FLYBACK POWER CONVERTER

CROSS-REFERENCE TO RELATED APPLICATIONS

This application is a National Stage of International Application No. PCT/EP2021/051313 filed Jan. 21, 2021, which claims priority to German Patent Application No. 10 2020 203 991.7 filed Mar. 27, 2020. The entire disclosures of the above applications are incorporated by reference.

BACKGROUND OF THE INVENTION

The present invention relates to a DC-DC voltage converter, in particular to a DC-DC voltage converter for transferring power between a high-voltage grid and a low-voltage grid.

Vehicles that are driven entirely or at least partially electrically usually have a so-called traction battery, which provides electrical power for driving the vehicle. Traction batteries of this kind usually have an output voltage of several hundred volts, for example 400 volts. Moreover, the vehicles have a so-called low-voltage grid, to which further loads, such as lighting, auxiliary drives, on-board computers or the like, for example, are connected. The low-voltage grid of a vehicle is usually supplied with electrical power from the high-voltage grid. To this end, the voltage from the high-voltage grid needs to be converted to the voltage level of the low-voltage grid. Moreover, electrical isolation must also usually be provided between the high-voltage grid and the low-voltage grid.

The document DE 10 2016 220 679 A1 discloses a DC-DC voltage converter and a method for actuating a DC-DC voltage converter with a so-called phase-shifted full-bridge DC-DC voltage converter. In particular, this document proposes reducing the number of lossy switching operations through suitable actuation of the DC-DC voltage converter. In various implementations, systems, apparatuses, methods, and techniques described in this specification may provide technical benefits over topologies such as dual active bridges by reducing the number of switches for implementation.

SUMMARY OF THE INVENTION

The present invention discloses a DC-DC voltage converter, in particular a DC-DC voltage converter for transferring power between a high-voltage grid and a low-voltage grid. Further advantageous embodiments are the subject of the dependent patent claims.

The following is accordingly provided:

A DC-DC voltage converter for transferring power between a high-voltage grid and a low-voltage grid. The DC-DC voltage converter comprises an input connection, a transformer, a first switching element, a second switching element, a third switching element, a fourth switching element and a capacitor. The input connection is designed to be coupled to a DC voltage source. The transformer has a primary side and a secondary side. A first connection of the primary side of the transformer is connected to a first connection element of the first input connection. A first connection of the first switching element is connected to a second connection of the primary side of the transformer. A second connection of the first switching element is connected to a second connection element of the input connection. A first connection of the second switching element is connected to the first connection of the primary side of the transformer. A second connection of the second switching element is connected to a node. A first connection of the capacitor is connected to the node. A second connection of the capacitor is connected to the second connection of the primary side of the transformer. A first connection of the third switching element is connected to the node. A second connection of the third switching element is connected to a first connection of the fourth switching element. Finally, a second connection of the fourth switching element is connected to the second connection of the input connection.

The present invention is based on the knowledge that a low-voltage grid of an electric or hybrid vehicle is usually supplied with power from a high-voltage grid. To this end, electrical isolation is usually required between the high-voltage grid and the low-voltage grid. Moreover, the present invention is based on the knowledge that, with continuous further development of the vehicles, the power and in particular also the battery capacity of electrically driven vehicles are increasing. In light of this, traction batteries with a higher output voltage are also increasingly being used. Therefore, in order to couple a high-voltage grid to a low-voltage grid, DC-DC voltage converters which have a sufficient dielectric strength are also required. DC-DC voltage converters which can be used over as wide an input voltage range as possible are also accordingly desirable.

It is therefore a concept of the present invention to take this knowledge into account and to provide a DC-DC voltage converter which can meet the above-mentioned demands. To this end, the invention that follows provides a circuit design for a DC-DC voltage converter for coupling a high-voltage grid to a low-voltage grid, which converter has a very simple circuit topology. The DC-DC voltage converter can convert the input DC voltage into a predefined output DC voltage over a very large input voltage range. The circuit design according to the invention makes it possible, in particular, to guarantee a sufficient dielectric strength at high input DC voltages even with conventional components. By virtue of the relatively simple circuit topology, the DC-DC voltage converter can be realized in a particularly cost-effective manner. Furthermore, the DC-DC voltage converter according to the invention also requires only a relatively small installation space.

According to one embodiment, the DC-DC voltage converter comprises a rectifier. The rectifier is coupled to the secondary connection of the transformer. Furthermore, the rectifier is designed to rectify a voltage applied to the secondary connection of the transformer. The rectified voltage can then be provided at an output connection of the DC-DC voltage converter. The voltage at the secondary connection of the transformer can be rectified in any way by means of an active or passive rectifier. By means of the transformer and subsequent rectification, it is therefore possible to realize electrically isolated power transfer from the high-voltage grid to the low-voltage grid.

According to one embodiment, the rectifier comprises a rectifier diode. Alternatively, the rectifier can also comprise a semiconductor switch, in particular with a rectifier diode provided in parallel with the semiconductor switch. The semiconductor switch can be actively actuated in this case, wherein the voltage on the secondary side of the transformer is rectified as a result of the semiconductor switch being actuated. As a result of an active rectification of this kind by means of a semiconductor switch, the power loss can be reduced and the efficiency can therefore be increased. Alternatively, a particularly cost-effective rectification can be realized by way of a rectifier diode.

According to one embodiment, the first switching element, the second switching element, the third switching element and the fourth switching element each comprise a semiconductor switch. A diode, in particular a so-called body diode, can in particular be provided in parallel with each semiconductor switch. The semiconductor switch can be a transistor, for example, in particular an insulated-gate bipolar transistor (IGBT). Any other semiconductor switches, such as MOSFETs or silicon carbide switches, for example, are of course also possible.

According to one embodiment, the diode which is provided in parallel with the third switching element is arranged in the opposite orientation to the diode which is provided in parallel with the fourth switching element. In this way, it can be ensured that electrical interruption can also take place in the path containing the third and fourth switching elements.

According to one embodiment, the DC-DC voltage converter comprises a control device. The control device can be designed to actuate the first switching element, the second switching element, the third switching element and the fourth switching element. Furthermore, if an active switching element is provided in the rectifier of the DC-DC voltage converter, the control device can actuate this switching element of the DC-DC voltage converter too. In this way, the actuation of the individual switching elements can be synchronized in a targeted manner.

According to one embodiment, the control device is designed so as, in a first operating mode, to open the third switching element and the fourth switching element and to actuate the first switching element and the second switching element each in an alternately clocked manner. Furthermore, in a second operating mode, the control device can open the first switching element and close the fourth switching element. Moreover, in a second operating mode, the second switching element and the third switching element can be actuated each in an alternately clocked manner. In this way, in the first operating mode, a DC-DC voltage conversion between the high-voltage side and the low-voltage side can take place on the basis of a so-called flyback converter, in particular an active-clamp flyback converter, and, using the same circuit topology, in a further operating mode, the circuit can be operated as an active-clamp buck converter. As a result, the DC-DC voltage converter can be suitably actuated in each case over a large voltage range.

According to one embodiment, an input voltage at the input connection of the DC-DC voltage converter for the actuation in the second operating mode is greater than the input voltage for the actuation in the first operating mode. A respectively suitable operating mode for the DC-DC voltage conversion can be selected, for example, by means of the control device for the actuation of the individual switching elements.

The above refinements and developments can be combined with each other in any appropriate way. Further refinements, developments and implementations of the invention also comprise combinations that have not been explicitly mentioned of features of the invention that have been described above or below with regard to the exemplary embodiments. In particular, a person skilled in the art will also add individual aspects as improvements or additions to the respective basic forms of the invention.

BRIEF DESCRIPTION OF THE DRAWINGS

Further features and advantages of the invention are explained below on the basis of the figures, in which.

DETAILED DESCRIPTION

Figure 1:
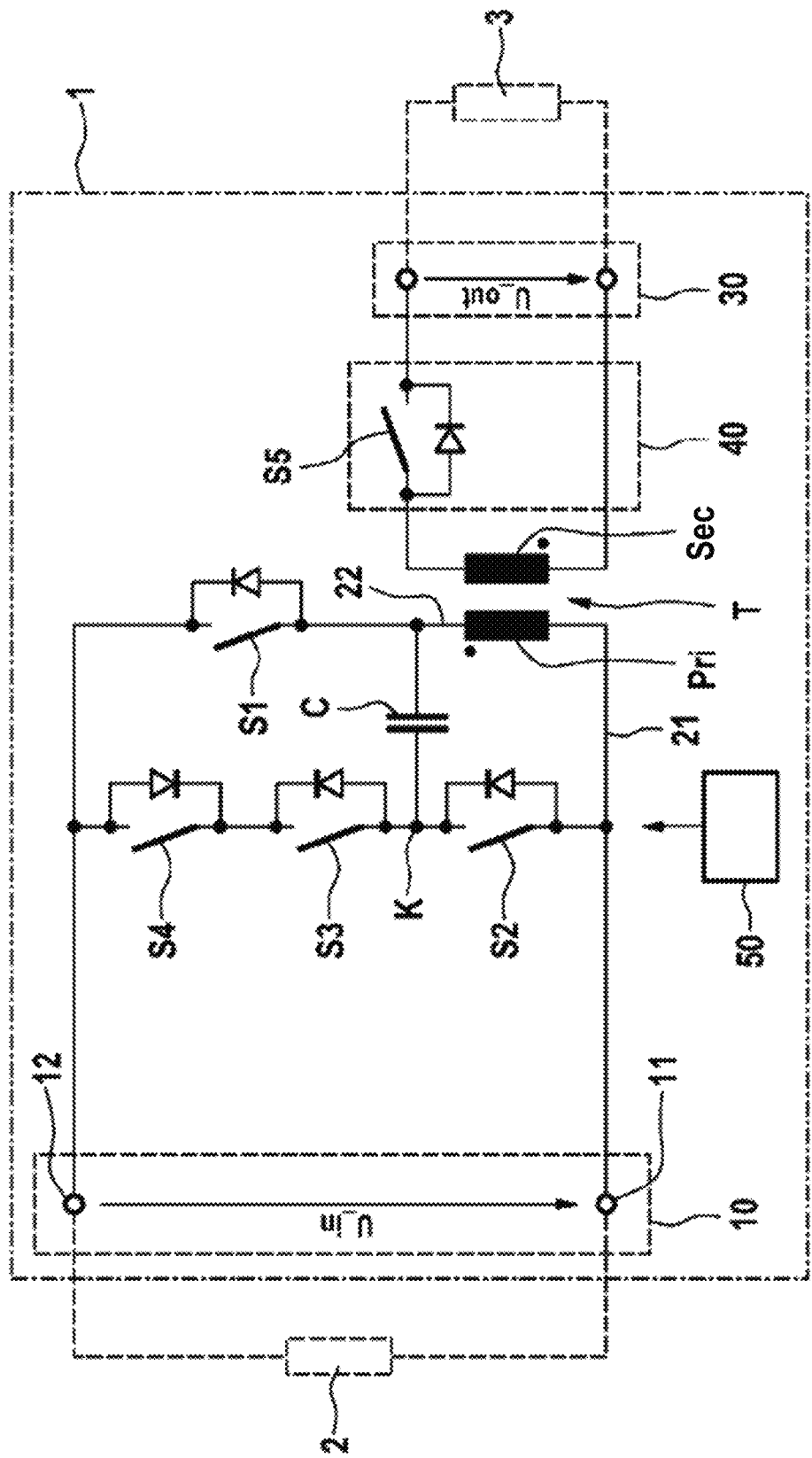
FIG. 1 shows a block diagram of a DC-DC voltage converter according to one embodiment.

FIG. 1 shows a schematic representation of a block diagram of a DC-DC voltage converter 1 according to one embodiment. The input side of the DC-DC voltage converter 1 can be connected, for example, to a high-voltage grid 2. The output side of the DC-DC voltage converter 1 can be connected, for example, to a low-voltage grid 3. For connection to the high-voltage grid, the DC-DC voltage converter 1 can have, for example, an input connection 10. Electrical power from a traction battery of an electric vehicle can be provided at this input connection 10, for example. Correspondingly, a voltage U_in is applied to the input connection 10. The DC-DC voltage converter 1 can convert this input voltage U_in into a further DC voltage and provide it as output DC voltage U_out at an output connection 30.

The DC-DC voltage converter 1 comprises, in addition to the input connection 10 and the output connection 30, a transformer T. The transformer T has a primary side Pri and a secondary side Sec. Furthermore, the DC-DC voltage converter 1 has, between the input connection 10 and the primary side Pri of the transformer T, four switching elements S1, S2, S3 and S4 and a capacitor C. A rectifier 40 is provided on the secondary side Sec of the transformer T.

The input connection 10 of the DC-DC voltage converter 1 comprises a first connection element 11 and a second connection element 12. An input DC voltage U_in can correspondingly be provided between the first connection element 11 and the second connection element 12. The first connection 11 of the input connection 10 is connected to a first connection 21 on the primary side Pri of the transformer T. A first switching element S1 is arranged between a second connection 22 on the primary side Pri of the transformer T and the second connection element 12 of the input connection 10. Furthermore, a second switching element S2 is arranged between the first connection 21 on the primary side Pri of the transformer T and a node K. A capacitor C is arranged between the node K and the second connection 22 on the primary side Pri of the transformer T. Moreover, a first connection of a third switching element S3 is connected to the node K and a second connection of the third switching element S3 is connected to a first connection of a fourth switching element S4. The second connection of the fourth switching element S4 is connected to the second connection element 12 of the input connection 10 and thus also to the corresponding connection of the first switching element S1.

As already stated above, a rectifier 40 is provided between the secondary side Sec of the transformer T and the output connection 30 of the DC-DC voltage converter 1. The rectifier 40 can be, for example, a passive diode, which is provided between a connection on the secondary side Sec of the transformer T and a connection element of the output connection 30. Alternatively, an active rectification can also be performed by means of a switching element S5, in particular a semiconductor switching element, which is arranged between a connection on the secondary side Sec of the transformer T and a connection element of the output connection 30.

For actuating the switching elements, in particular the first, second, third and fourth switching elements S1-S4, and optionally the switching element in the rectifier 40, a control device 50 can be provided. The operating principle and the switching sequence for the actuation of the switching elements are explained in more detail below.

Figure 2:
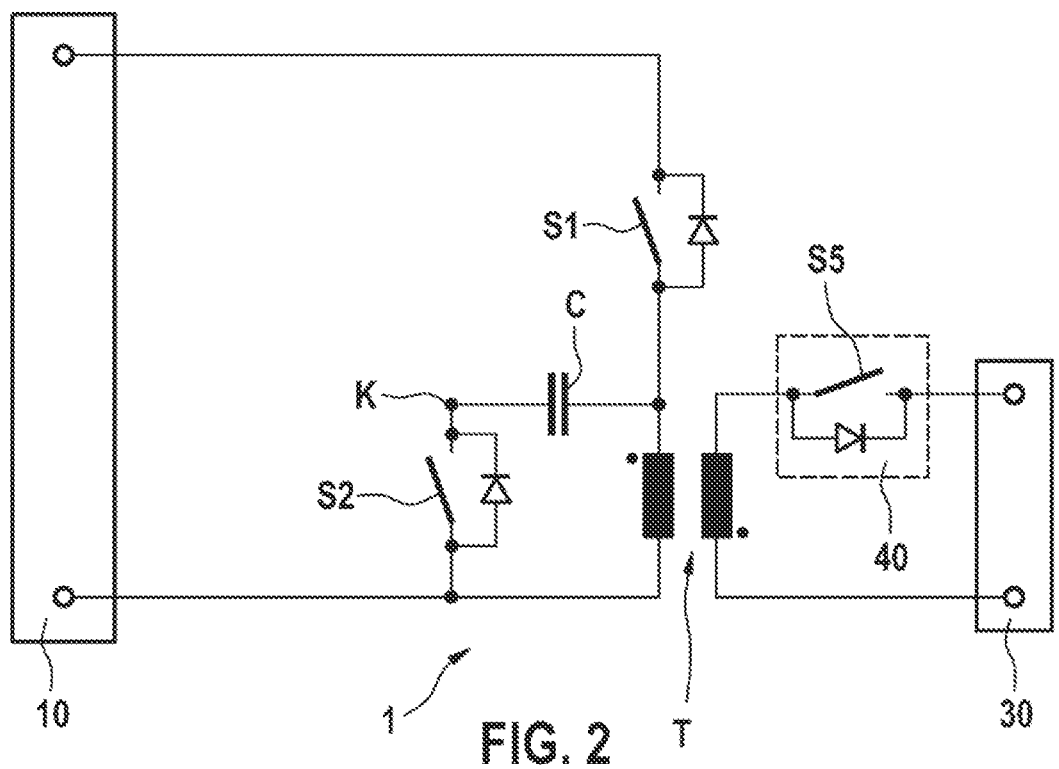
FIG. 2 shows a block diagram of a DC-DC voltage converter according to one embodiment in a first operating mode.

FIG. 2 shows a schematic representation of a block diagram of the DC-DC voltage converter 1 in a first operating mode. In this first operating mode, the DC-DC voltage converter 1 can, in particular, be operated as a so-called active-clamp flyback converter. The third switching element S3 and the fourth switching element S4 are open in this first operating mode. To promote better understanding, the third switching element S3 and the fourth switching element S4 are therefore not shown here. Closing the first switching element S1 magnetizes the transformer T. The second switching element S2 forms a clamping circuit together with the capacitor C in this arrangement. Subsequently, the first switching element S1 and the second switching element S2 are alternately actuated. The power transfer, in particular the output voltage, can be controlled in this case by adjusting the frequency and/or pulse width.

Figure 3:
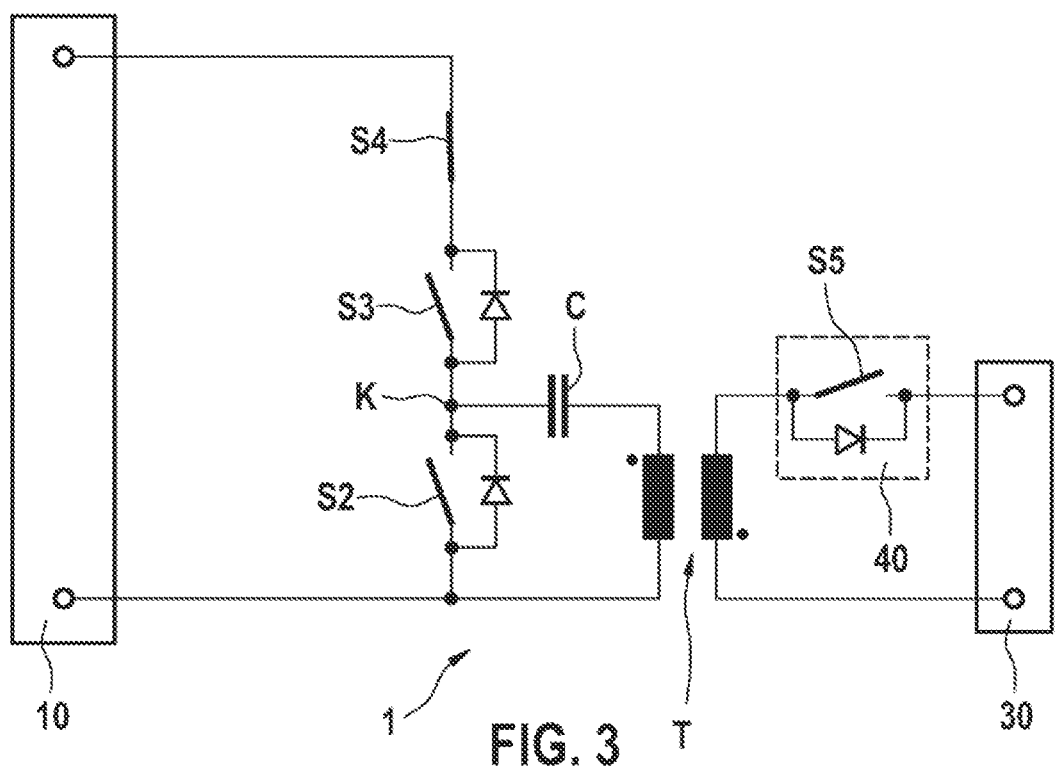
FIG. 3 shows a block diagram of a DC-DC voltage converter according to one embodiment in a second operating mode.

FIG. 3 shows a schematic representation of a block diagram of the DC-DC voltage converter 1 in a second operating mode. In this operating mode, the DC-DC voltage converter 1 functions as an electrically isolated active-clamp buck converter. The first switching element S1 is permanently open in this case and therefore is not shown in FIG. 3. Furthermore, the fourth switching element S4 is permanently closed in this operating mode.

The third switching element S3 magnetizes the transformer T. In this case, too, the clamping circuit consists of the second switching element S2 and the capacitor C. In the second operating mode, the second switching element S2 and the third switching element S3 are alternately clocked with a predefined frequency and pulse width.

In particular since the rectifier 40 is embodied as a simple, unidirectional rectifier, the configuration of the circuit arrangement of the DC-DC voltage converter 1 requires the transformer T to be magnetized in the same direction both in the first operating mode and in the second operating mode. This task of magnetizing is undertaken by the first switching element S1 in the first operating mode and by the third switching element S3 in the second operating mode. In both cases, the transformer T is then demagnetized when the power is transferred to the secondary side Sec of the transformer T. This takes place when the first switching element S1 or the third switching element S3, respectively, is switched off and the second switching element S2 is correspondingly switched on.

In the first operating mode, the first switching element S1 experiences a voltage load which results from the sum of the input voltage U_in and the product of the output voltage U_out and the transfer ratio of the transformer T. The first switching element S1 must therefore have a correspondingly high dielectric strength. In the second operating mode, the maximum voltage load on the switching elements is simply predefined by the maximum input voltage U_in. The second operating mode is therefore suitable for higher input voltages U_in, while the first operating mode can be preferred for the lower input voltages U_in.

For example, the circuit arrangement described can be used for a DC-DC voltage converter 1 and thus, for example, for traction batteries with a relatively low voltage level, for example voltages of up to 500 volts. For a DC-DC voltage conversion with higher input voltages, for example above 500 volts up to 800 or potentially 1000 volts, the same DC-DC voltage converter 1 can be operated in the second operating mode. Simple and cost-effective DC-DC voltage conversion for input DC voltage over a large voltage range is thus possible with a relatively low circuit complexity.

In summary, the present invention relates to a DC-DC voltage converter for transferring power from a high-voltage grid to a low-voltage grid. To this end, a simple circuit configuration is proposed which can be operated alternatively as an active-clamp flyback converter or an active-clamp buck converter.

The invention claimed is:

1. A DC-DC voltage converter (1) for transferring power between a high-voltage grid and a low-voltage grid, the DC-DC voltage converter (1) comprising:
    an input connection (10), which is designed to be coupled to a DC voltage source (2);
    a transformer (T) with a primary side (Pri) and a secondary side (Sec);
    a capacitor (C);
    a first switching element (S1), a second switching element (S2), a third switching element (S3) and a fourth switching element (S4);
    wherein a first connection (21) of the primary side (Pri) of the transformer (T) is electrically coupled to a first connection element (11) of the first input connection (10);
    a first connection of the first switching element (S1) is connected to a second connection (22) of the primary side (Pri) of the transformer (T) and a second connection of the first switching element (S1) is connected to a second connection element (12) of the input connection (10);
    a first connection of the second switching element (S2) is connected to the first connection (21) of the primary side (Pri) of the transformer (T) and a second connection of the second switching element (S2) is connected to a node (K);
    a first connection of the capacitor (C) is connected to the node (K) and a second connection of the capacitor (C) is connected to the second connection (22) of the primary side (Pri) of the transformer (T); and
    a first connection of the third switching element (S3) is connected to the node (K), a second connection of the third switching element (S3) is connected to a first connection of the fourth switching element (S4) and a second connection of the fourth switching element (S4) is connected to the second connection element (12) of the input connection (10).

2. The DC-DC voltage converter (1) as claimed in claim 1, further comprising a rectifier (40), which is coupled to the secondary side (Sec) of the transformer (T) and which is designed to rectify a voltage applied to the secondary side (Sec) of the transformer (T).

3. The DC-DC voltage converter (1) as claimed in claim 2, wherein the rectifier (40) comprises a rectifier diode or a semiconductor switch (S5), which is designed to rectify the voltage applied to the secondary side (Sec) of the transformer (T).

4. The DC-DC voltage converter (1) as claimed in claim 1, wherein the first switching element (S1), the second switching element (S2), the third switching element (S3) and the fourth switching element (S4) each comprise a semiconductor switch with a body diode.

5. The DC-DC voltage converter (1) as claimed in claim 4, wherein the body diode of the third switching element (S3) is arranged in the opposite orientation to the body diode of the fourth switching element (S4).

6. The DC-DC voltage converter (1) as claimed in claim 1, further comprising a control device (50), which is designed to actuate the first switching element (S1), the second switching element (S2), the third switching element (S3) and the fourth switching element (S4).

7. The DC-DC voltage converter (1) as claimed in claim 6, wherein the control device (50) is configured, in a first operating mode, to open the third switching element (S3) and the fourth switching element (S4) and to actuate the first switching element (S1) and the second switching element (S2) each in an alternately clocked manner, and, in a second operating mode, to open the first switching element (S1), to close the fourth switching element (S4) and to actuate the second switching element (S2) and the third switching element (S3) each in an alternately clocked manner.

8. The DC-DC voltage converter (1) as claimed in claim 1, wherein a value of an input voltage (U_in) at the input connection (10) for the actuation in the second operating mode is greater than a value of the input voltage (U_in) for the actuation in the first operating mode.

* * * * *